Figure 1:
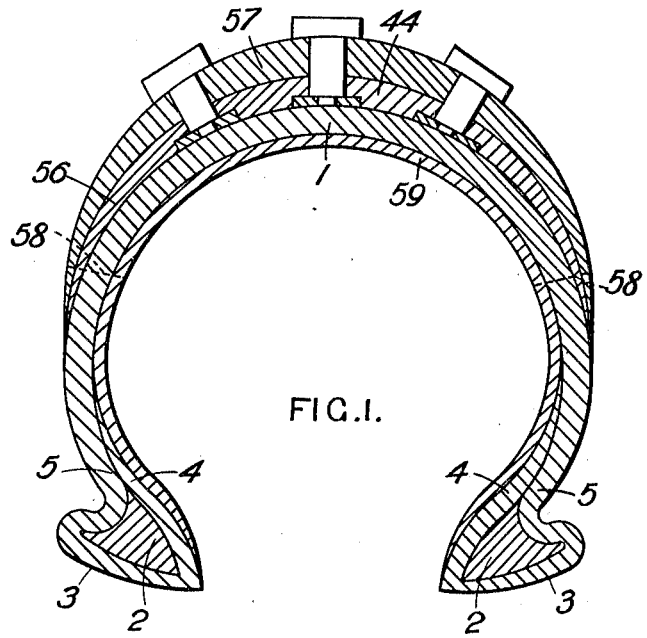

G. W. BELL.
METHOD OF MANUFACTURING TIRE COVERS.
APPLICATION FILED MAY 16, 1911.

1,096,487.

Patented May 12, 1914.

4 SHEETS—SHEET 1.

WITNESSES.
J. K. Cole
M. G. Crawford

INVENTOR.
George Wilson Bell
by B. Parkerhurst
Attorney

G. W. BELL.
METHOD OF MANUFACTURING TIRE COVERS.
APPLICATION FILED MAY 16, 1911.

1,096,487.

Patented May 12, 1914.

4 SHEETS—SHEET 3.

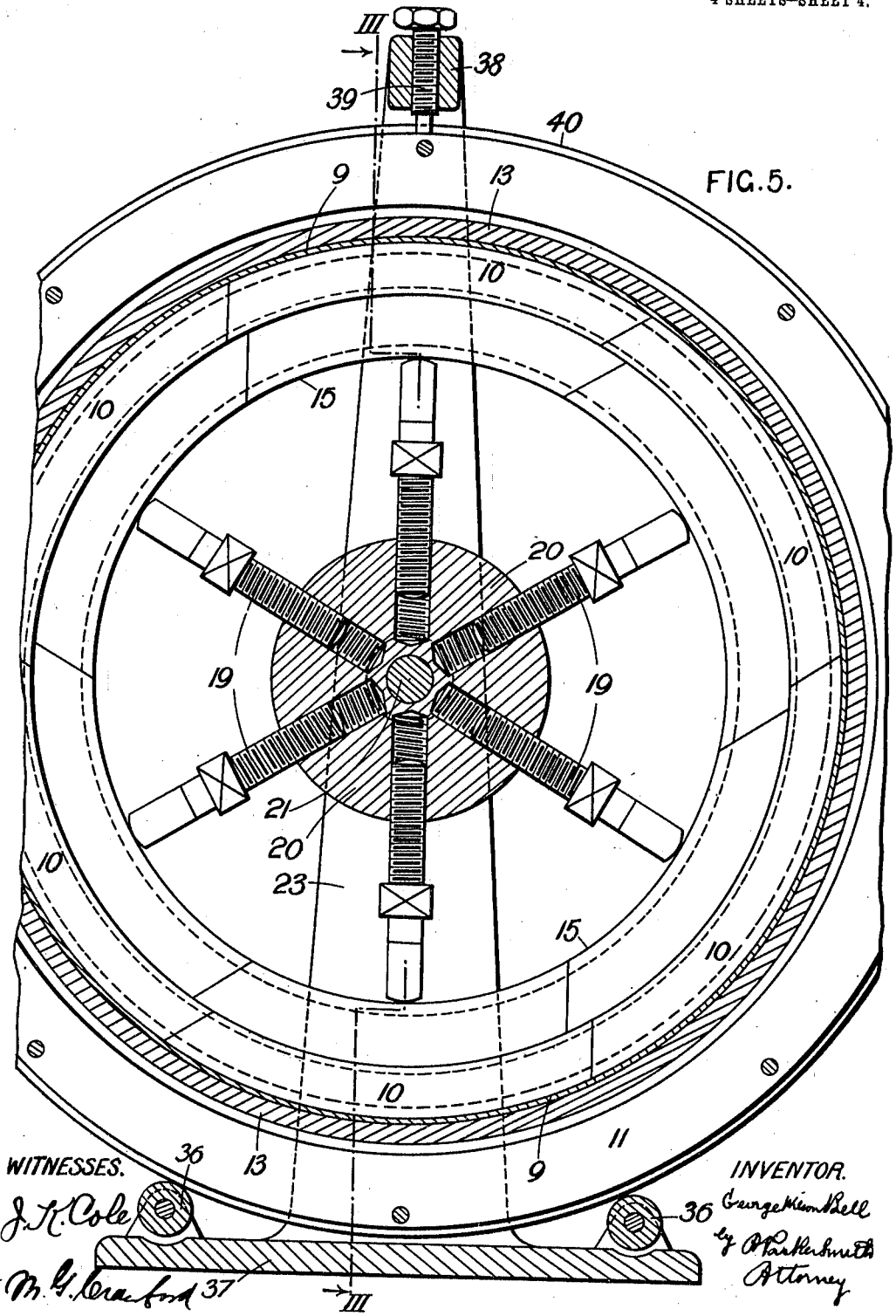

UNITED STATES PATENT OFFICE.

GEORGE WILSON BELL, OF STOCKPORT, ENGLAND.

METHOD OF MANUFACTURING TIRE-COVERS.

1,096,487. Specification of Letters Patent. Patented May 12, 1914.

Original application filed February 10, 1911, Serial No. 607,811. Divided and this application filed May 16, 1911. Serial No. 627,433.

*To all whom it may concern:*

Be it known that I, GEORGE WILSON BELL, a subject of the King of Great Britain and Ireland, and a resident of Stockport, in the county of Chester, England, have invented certain new and useful Improvements in and Pertaining to the Method of Manufacturing Tire-Covers, of which the following is a specification.

This application for Letters Patent relates to the manufacture of leather outer casings or covers (hereinafter referred to as covers) for the air tubes of pneumatic tires and is a division of application Serial No. 607811 filed 10th February 1911, according to which in such a cover a strip of leather curved to the ordinary cross-sectional form of a tire cover is at each of its edges so bent about a core as to form in conjunction with the core a bead suitable for securing the tire to an ordinary clencher or analogous wheel rim, the extreme edge portion of the strip being chamfered and cemented to the internal surface of the cover.

According to a method of making such a cover to which this application relates a band formed of a U-shaped strip of undried chrome leather or composed of two or more such strips placed end to end and having their chamfered ends secured together, is clamped by means of dies of semi-circular cross-section in an annular mold from which the edge portions of the band, which are chamfered, project radially inward. These edge portions are now turned over bead-forming pieces and forced radially outward and pressed against the bead-forming pieces by means of internal radially moving dies and continuations of the mold. The bead-forming pieces are now removed and cores placed and cemented in the bead-recesses formed thereby. Each bead-forming piece is or may be adapted not only to form a recess suitable for the reception of the core, but also to act as an abutment for the corresponding turned-over edge portion and to bear against one or more of the semi-circular dies while the edge portion is being acted upon by the corresponding radially moving die or dies. Each core may be of any suitable material, as oak-tanned leather, which has or may have an internal strip or ring of inextensible or comparatively inextensible material; or each core may itself be a strip or ring of inextensible material. The turned-over edge portions of the strips are now, preferably after the application of adhesive material, pressed against the internal faces of the side walls of the cover by means of transversely moving external dies which are substituted for the aforesaid continuations of the mold and act in opposition to internal dies, the external dies being adapted to complete the formation of the beads and the internal dies to give to the interior of the radially internal portion of the cover a shape suited to the securing devices with which the cover is to be used. The band is if necessary cut to the lengths required to produce a cover of the desired diameter, and the chamfered ends of the strip or strips are cemented and if necessary sewn together.

The invention is illustrated by the accompanying drawings, of which—

Figure 2:
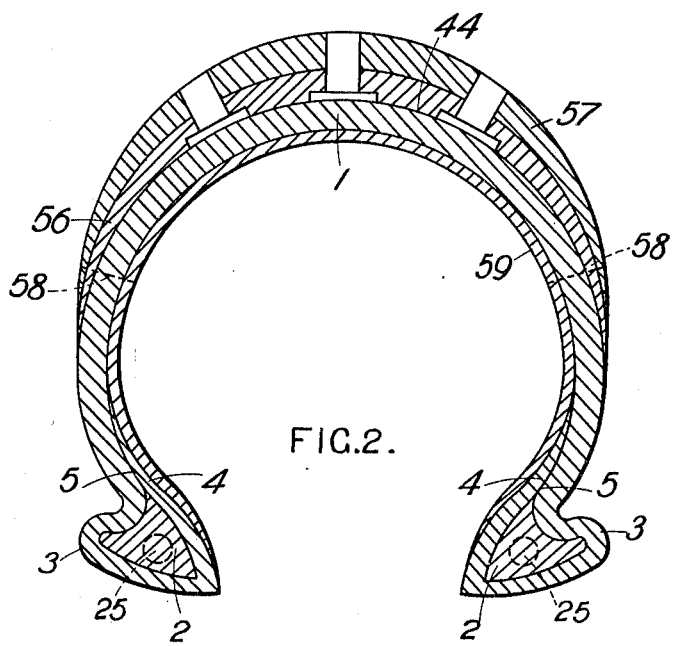
Figure 3:
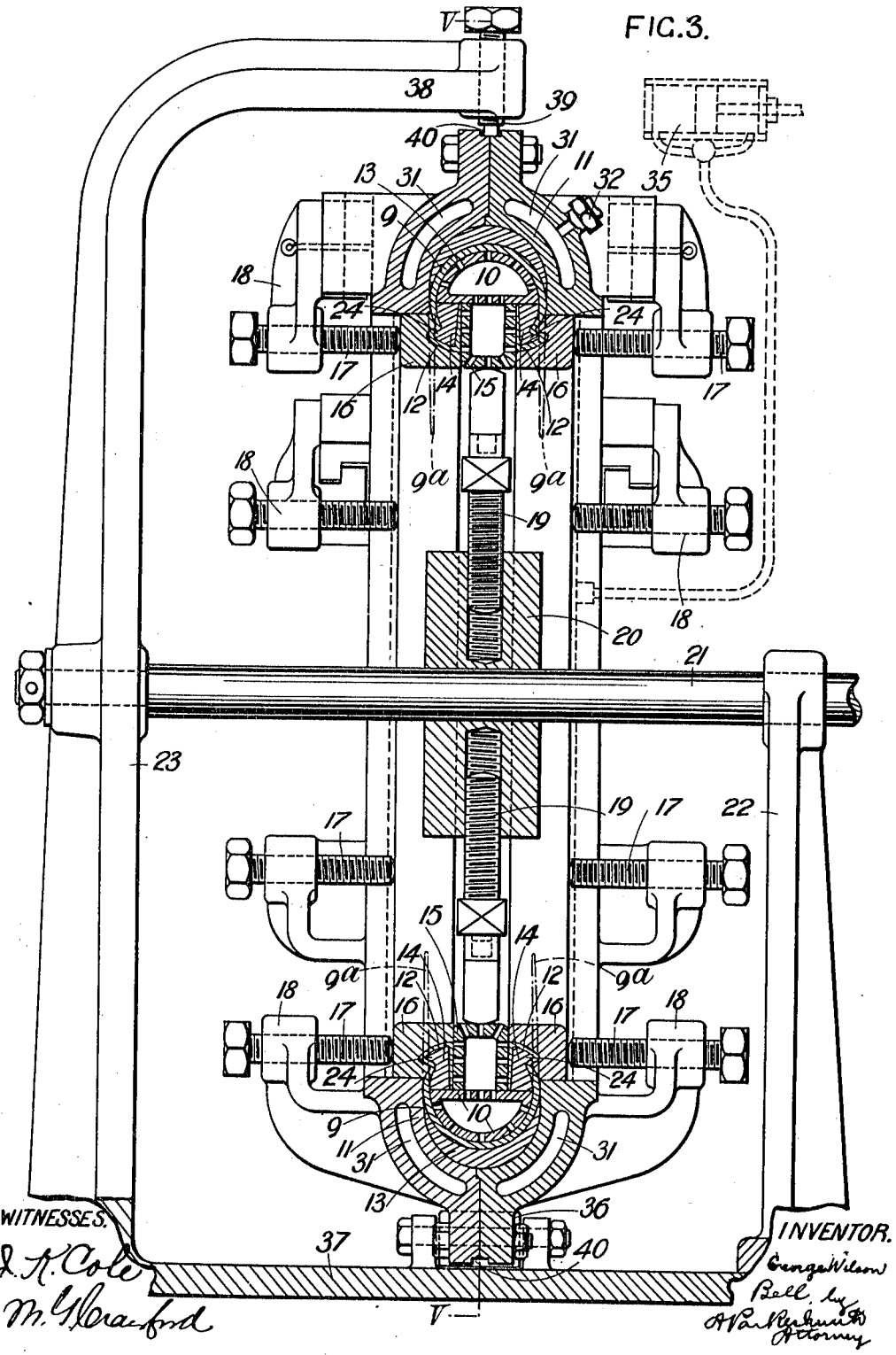
Figure 4:
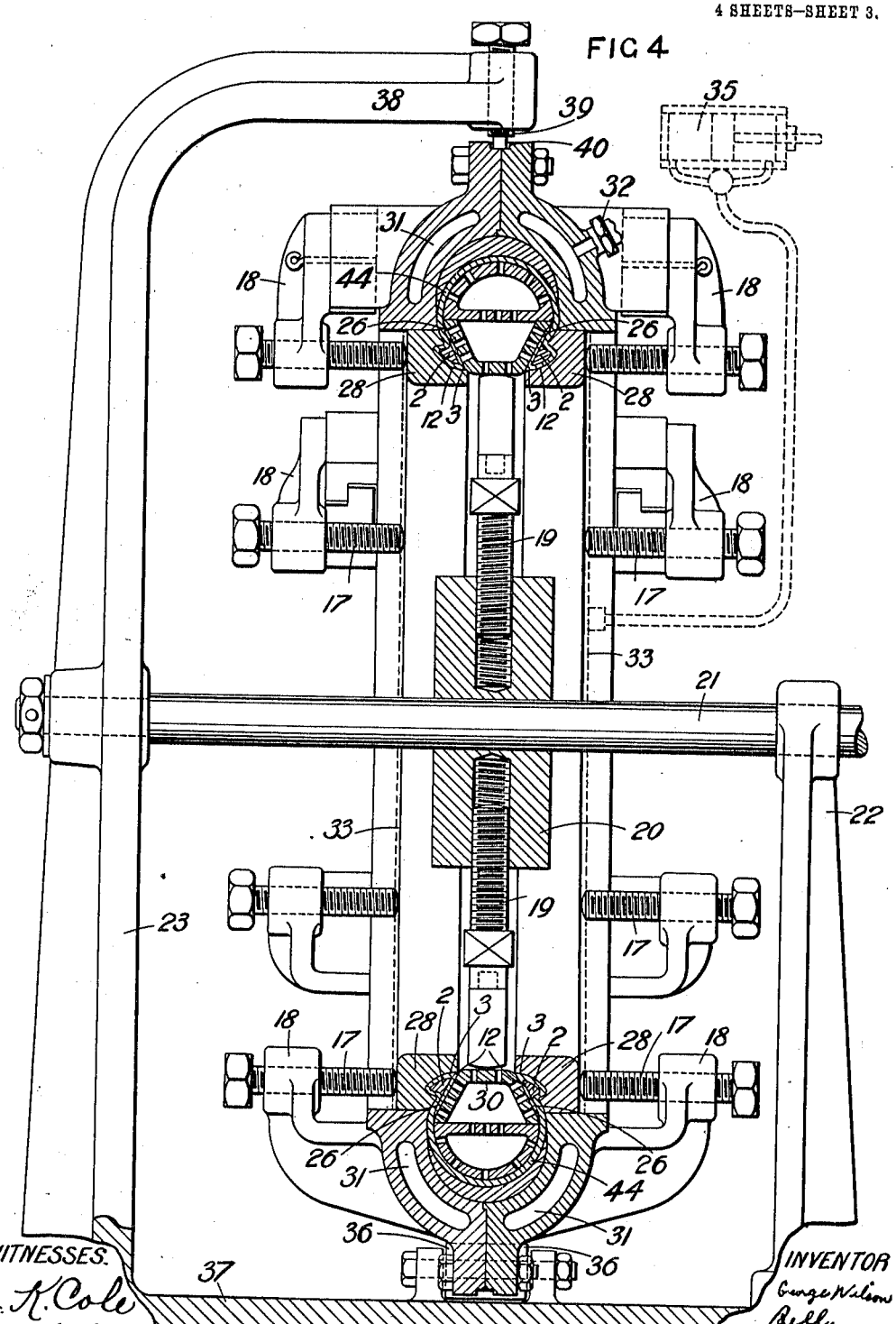

Figures 1 and 2 are cross-sections of the examples of leather tire covers made according to this invention, while Figs. 3 and 4 illustrate two steps in the said method of making a cover; and Fig. 5 is a view taken at right angles to Fig. 3 and corresponds partly to the line V of Fig. 3, which itself corresponds to the line III of Fig. 5.

In each of the examples shown in Figs. 1 and 2, 1 is a strip of leather curved to the ordinary cross-sectional form of a tire cover and at each of its edges so bent about a core 2 as to form, in conjunction with the core, a bead 3 suitable for securing the tire to an ordinary clencher or analogous wheel rim, the extreme edge portion 4 of the strip at each side thereof being chamfered and cemented, and, it may be, sewn, to the internal surface of the cover at 5. By bending the edge portions of the strip 1 thus about the cores 2 and securing their extreme edges to the internal surface of the cover in this manner a very strong attachment of the edges of the cover to the body portion thereof and a very firm securing of the cores 2 and the beads 3 are obtained. It will be seen that the greater the pressure of the air tube on the interior of the cover the more firmly will the edge portions 4 be pressed and held against the adjacent portions of the cover to which they are attached. According to the said method of making such a cover a band 9 (Fig. 3) formed of a strip of undried chrome leather, or composed of two or more such strips placed end to end and having their chamfered ends secured together, is clamped by means of dies 10 of semi-circular cross-section in an annular mold 11 into which the band is placed so that it assumes a U-shape in cross-section and from which the edge portions 12 of the band 9, which are chamfered, initially project radially inward, as indicated at 9ᵃ by dotted lines in Fig. 3, when the band is so clamped in the mold. In the drawing the mold 11 is shown containing a liner 13 for a purpose hereinafter mentioned. As will be seen from Fig. 5 the annular mold 11 contains six dies 10, which, to facilitate their insertion into the mold, are made so that each overlaps radially inward an adjacent one, and one of them thus overlaps two adjacent ones. The projecting edge portions 12 are then turned laterally inward over bead-forming pieces 14 (of which there are three at each side to facilitate insertion) by means of transversely movable dies, or mold continuations, 16, and the laterally inturned portions forced radially outward and pressed against the bead-forming pieces 14 by means of inturned radially movable dies 15, which are similar to the dies 10 as to number and as to overlapping. The dies 16 are then still further advanced to press the sides of the band against the bead-forming pieces 14 so as to form the recesses 24 for the reception of the cores 2. The dies 16 are operated by means of screws 17 engaging in lugs 18 projecting from the mold 11 and the dies 10 and 15 are forced into and held in position by means of screws 10 engaging in a block 20 mounted loosely on a shaft 21, which, when the block 20 has been brought into position, is supported by a bracket 22 and a standard 23. It will be seen that the bead-forming pieces 14 in addition to being so shaped as to produce the bead recesses 24 also act as abutments for the turning over of the edge portions 12. Comparatively little if any lateral pressure is exerted upon the bead-forming pieces 14 during the operation of turning the edge portions 12 laterally inward and not until the dies 15 have pressed the edge portions against the internal faces of the bead-forming pieces 14 is any appreciable pressure brought to bear on the external lateral faces of the bead-forming pieces by the dies 16 to force the leather against the bead-forming pieces to produce the bead recesses 24. The bead-forming pieces 14 are now removed and the cores 2 (Fig. 4) placed and cemented in the bead recesses 24. Each core 2 may be of leather or it may be of rubber and, as indicated by dotted lines in Fig. 2, have an internal ring 25 of inextensible or comparatively inextensible material, or each core 2 may itself be a ring of inextensible material. The turned-over edge portions 12 of the strip are now, preferably after the application of adhesive material, pressed against the internal faces of the side walls 26 of the partly formed cover 44 by means of transversely moving external annular dies 28, which are substituted for the continuations 16 of the mold and act in opposition to internal dies 30 under the pressure of the screws 17, the external dies 28 being adapted to complete the formation of the beads 3 and the internal dies 30 to give to the interior of the radially internal portion of the cover a shape suited to the securing devices with which the cover is to be used.

To enable the dies 15 and 16 to be removed and the dies 28 (which are annular) and the dies 30 (which overlap like the dies 10) to be inserted, the screws 19 are retracted and the block 20 drawn back on the shaft 21; for the same purpose the lugs 18 on half the periphery at each side of the mold are adapted to slide radially in the mold 11, as indicated in the upper half of Figs. 3 and 4. During the molding of the beads in this way, the dies 30 are held in position by the screws 19 and the block 20. The drying of the leather is effected while the leather is being thus molded, the mold being formed with cavities 31, which are supplied through unions 32 with steam or hot water and the dies 10, 15, and 30 being perforated to allow of the escape of vapor. During the operation illustrated by Fig. 4, to complete the drying, plates 33, indicated by dotted lines in Fig. 4, are preferably placed between the screws 17 and the dies 28, the shaft 21 being first withdrawn, and the chamber formed by and between the plates 33 connected, as indicated by dotted lines, with an air pump 35.

To enable the mold to be rotated to facilitate the manipulation of the leather and of the apparatus the mold is supported by two rollers 36 mounted on a base piece 37, to which are secured the bracket 22 and the standard 23, which at its upper end has a horizontal portion 38 from which a set-screw 39 projects into an annular groove 40 in the mold.

The band or partly finished cover is, if necessary, cut to the length required to produce a cover of the desired diameter and the chamfered ends of the strip or strips are cemented, and, if necessary, sewn together.

It will be evident that hydraulic or pneumatic apparatus might be employed instead of screws for operating the various dies.

To protect the tread portion of the cover 44, a ring 56 (Figs. 1 and 2) formed of a U-shaped strip of undried chrome leather or composed of two or more such strips placed end to end and having their chamfered ends secured together may be cemented to the exterior of the cover 44, the joints of the ring 56 being arranged so as to be not opposite to those of the cover 44. Another similar ring 57 may, as shown in Figs. 1 and 2, be cemented to the exterior of the ring 56. The ring or rings 56 and 57 may advantageously, in addition to being cemented, be secured to the cover 44 by means of rows of stitching 58. The external ring or rings may advantageously be formed in the mold 11: to form the two bands 56 and 57 simultaneously in the mold 11, the liner 13 may be removed and internal dies, slightly differing in form from the dies 10, employed. The external ring or rings 56 and 57, which are renewable, may be formed or provided with suitable non-skidding or wear-resisting devices.

The cover may, as shown in Figs. 1 and 2, be provided with a lining 59 of thin leather, which may be cemented thereto and may be loose thereon, except at its edges, which are suitably secured to the edge portions of the cover 44 as by being cemented thereto.

What I claim is:—

1. The method of manufacturing leather pneumatic tire covers, comprising pressing the lateral edge portions of an annular band of leather of U-shape in cross-section inwardly around suitably shaped removable bead-forming pieces in order to form recesses for the reception of cores, removing said bead-forming pieces, and securing suitably shaped cores in said recesses substantially as described.

2. The method of manufacturing leather pneumatic tire covers, comprising pressing the lateral edge portions of an annular band of leather of U-shape in cross-section inwardly around suitably shaped removable bead-forming pieces in order to form recesses for the reception of cores, removing said bead-forming pieces, inserting suitably shaped cores in said recesses, pressing the extreme edge portions of said band of leather against the interior of the cover, and securing said extreme edge portions thereto substantially as described.

3. The method of manufacturing leather pneumatic tire covers, comprising pressing the lateral edge portions of an annular band of leather of U-shape in cross-section laterally inward and then radially outward around suitably shaped bead-forming pieces in order to form recesses for the reception of cores, removing said bead-forming pieces, and securing suitably shaped cores in said recesses substantially as described.

4. The method of manufacturing leather pneumatic tire covers, comprising pressing the lateral edge portions of an annular band of leather of U-shape in cross-section laterally inward and then radially outward around suitably shaped bead-forming pieces in order to form recesses for the reception of cores, removing said bead-forming pieces inserting suitably shaped cores in said recesses, pressing the extreme edge portions of said band of leather against the interior of the cover, and securing said extreme edge portions thereto substantially as described.

Signed at Manchester, in the county of Lancaster, England, this 4th day of May, 1911.

GEORGE WILSON BELL.

Witnesses.
  JOHN WILLIAM THOMAS,
  MALCOLM SMETHURST.

Copies of this patent may be obtained for five cents each, by addressing the "Commissioner of Patents, Washington, D. C."